United States Patent Office 3,676,209
Patented July 11, 1972

3,676,209
ANTISTATIC FILM PROPERTIES USING METHYL VINYL ETHER/MALEIC ACID INTERPOLYMER
E. Scudder Mackey, Binghamton, and Vincent J. Miceli, Conklin, N.Y., assignors to GAF Corporation, New York, N.Y.
No Drawing. Continuation-in-part of application Ser. No. 728,346, May 10, 1968. This application June 12, 1970, Ser. No. 45,941
Int. Cl. G03c *11/00;* C09h *3/16*
U.S. Cl. 117—161 UC    4 Claims

ABSTRACT OF THE DISCLOSURE

Photographic film resistant to the accumulation of static electrical charges thereon is obtained by adding to the outermost layer on at least on side of the film a neutralized interpolymer of methyl vinyl ether and maleic acid, typically in amounts from one to ten percent by weight based on the solids content of the outermost layer.

---

This invention relates to photographic film which is resistant to the accumulation of static electrical charges, and, more particularly, to photographic film having on at least one side thereof an outermost layer comprising an interpolymer of methyl vinyl ether and maleic anhydride, which interpolymer prevents the accumultaion of static electrical charges on the film.

This application is a continuation-in-part of our copending application, Ser. No. 728,346, which was filed on May 10, 1968, and is now abandoned.

Considerable difficulty is encountered during the manufacture and use of photographic film because of the accumulation of electrical charges thereon produced by frictional contact of the film with rollers or other parts of the machine through which it passes, by slitting or unwinding the film, by contact of the film with similar surfaces, by handling the film, and by other causes well known to those experienced in making and using such films. Such charges can also accumulate on continuous film such as motion picture film when transported rapidly through a camera. Such charges which occur in film prior to development manifest themselves after processing by formation of irregular streaks, patterns or lines in the film caused by lightning-like exposures of the emulsion at such portions.

Long, continuous motion picture films generally have a sensitized layer in coincident contact with the surface of a base support layer. When the two layers are rapidly separated, a static charge is created at the interface. This "pick-off" static appears as circular specks on the processed film. Dewinding of motion picture film produces yet another kind of static if the edges of the film rub against the camera spool flanges. This type appears on the processed film as streaks or lines starting at the edges and continuing in one or more paths toward the center of the film.

Previous attempts to overcome static in photographic films have, for the most part, utilized conducting or hygroscopic materials in the surface of the film to increase electrical conductivity and prevent the formation of static electrical charges. Such methods have not proven wholly satisfactory, particularly under conditions of low humidity, where the static problem is most acute. Further, some other materials proposed as antistatic agents are incompatible with the other ingredients used in the film, or have adverse effects on the photographic emulsion.

It is an object of this invention to provide photographic film which is highly resistant to the accumulation of static electrical charges thereon.

Another object of the invention is to provide an antistatic material particularly suitable for use in lengthy, continuous pohtographic film which is subject to continuous frictional contact with objects such as winding devices.

Still another object of the invention is to provide an antistatic agent, and photographic film having the antistatic agent in the outermost layer on at least one side thereof, which is compatible with the other ingredients used in the film, and has no adverse effects on the photographic emulsion.

The instant invention provides photographic film free of static electrical charges, said film having on at least one side thereof an outermost layer comprising a sufficient amount of neutralized and hydrolyzed interpolymer of methyl vinyl ether and maleic anhydride to prevent accumulation of static electrical charges on the film.

These antistatic agents may be represented by the following general formula:

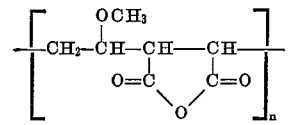

wherein the symbol $n$ represents a positive integer having a value of from 35 to 3500. Preferably, the polymeric antistatic agents of this invention will have a low molecular weight, typically within the range of from 5000 to 500,000, and will be in the form of a salt. Polymers having a molecular weight within this range do not adversely influence the viscosity of the coating solutions containing them which are applied to the photographic film. Particularly suitable interpolymers have a specific viscosity within the range 0.1 to 4 centistokes, and preferably from 0.1 to 2 centistokes (determined in a 1% methyl ethyl ketone solution).

Specific preferred polymers include 1% methyl ethyl ketone solutions of Gantrez AN–119 (specific viscosity 0.1–0.5 centistokes), Gantrez AN–139 (specific viscosity 1.0–1.4 centistokes), and Gantrez AN–169 (specific viscosity 2.6–3.5), all made by GAF Corporation, New York, N.Y.

As noted above, the antistatic agent of this invention should be present in amounts sufficient to prevent accumulation of static electrical charges on the photographic film. Specifically, the antistatic agents can be present in an amount of from 1 to 10% by weight based on the solids content of the outermost layer (or layers) containing the antistatic agent.

These interpolymers are added to the aqueous solution of a film-forming material such as gelatin before being applied to form the antistatic layers on the photographic film. When kept in aqueous solution for a short period of time and when neutralized with suitable salt forming materials, the anhydrides are changed by hydrolysis and neutralization to form compounds having the following formulation:

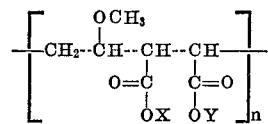

In this formula $n$ has the values given above and X and Y are hydrogen or a salt forming cation such as an alkali metal, e.g., potassium, sodium or lithium; and organic base such as triethylamine, ethanolamine, diethanolamine, triethanolamine, trimethylanolamine, morpholine and the like. X and Y may be alike or different except that at least one of them must be a salt-forming entity to form the neutralized version of the interpolymer of the maleic acid derivative.

The following examples show that photographic film containing the antistatic agent of the invention in the outermost layer on at least one side thereof are completely resistant to the accumulation of electrical static charges thereon.

EXAMPLE I

Two surface coating compositions, only one of which contained the antistatic agent of this invention, were applied to a pair of black and white cine film-type emulsions. The control surface layer, which contained no antistatic agent, comprised neutralized gelatin, a hardening agent, and a coating aid. In addition to these ingredients, the second surface coating composition contained 4% by weight (based on the solids content of the coating composition) of an interpolymer of methyl vinyl ether and maleic acid previously neutralized with a sodium hydroxide solution having a molecular weight of about 250,000.

After drying, the surface coatings were prepared for a static evaluation test which simulated the type of static discharge which occurs during the transportation of film from a dewinding to a winding operation. High speed cine films are particularly sensitive to this type of static which can occur during slitting, perforating, and/or spooling operations.

Ten samples of the control film, and of the film containing the antistatic agent of the invention, were cut into strips 35 mm. wide and 10 inches long. After conditioning at 20% relatively humidity and 70° F. for 24 hours, each strip was rubbed in total darkness on the emulsion side with the fingers to generate static electricity in the film. The film strips were then processed simultaneously in the usual manner. Visual examination for static discharge marks, which can readily be recognized by black speck-like spots or patterns in the otherwise clear coatings, yielded the following results: Nine of the ten strips bearing the control surface coating showed varying degrees of static speck defects, while none of the ten strips bearing the surface coating containing the antistatic agent of the invention showed any static defects whatsoever.

EXAMPLE II

Two photographic surface coating compositions were prepared as in Example I. The two films bearing these compositions were slit, perforated, and spooled for camera use in a way which is common in the industry. Film strips bearing these compositions and having the dimensions of 16 millimeters in width by 100 feet in length were conditioned for several days at 20–22% relative humidity. Several rolls of the control film and of the film bearing the antistatic agent of the invention were run through a camera. The film was then processed in a way common for a black and white cine film of the high-speed reversal type. Examination of the control material showed objectionable static spots, while the films bearing the antistatic agent of the invention in the surface coatings were free of static mark defects.

Various modifications and variations of this invention will be obvious to persons skilled in the art, but it should be understood that such modifications are included within the spirit and scope of the invention.

We claim:

1. Photographic film having on at least one side thereof an outermost layer comprising from 1 to 10% by weight of solids in the outermost layer of water-soluble salt of an interpolymer of methyl vinyl ether and maleic acid to prevent accumulation of static electrical charges on said film, said interpolymer having a specific viscosity in a 1% methyl ethyl ketone solution of from 0.1 to 4 centistokes.

2. The film of claim 1, wherein said interpolymer has a molecular weight within the range of from 5,000 to 500,000.

3. The film of claim 1, wherein said interpolymer is present in an amount of 4% by weight of solids of said outermost layer.

4. The film of claim 1, wherein said interpolymer is present in an amount of 4% by weight of solids of said outermost layer, and has a molecular weight of about 250,000.

References Cited

UNITED STATES PATENTS

| | | | |
|---|---|---|---|
| 3,002,955 | 10/1961 | Sellers | 117—161 X |
| 2,279,410 | 4/1942 | Nadeau et al. | 96—87 |
| 3,318,851 | 5/1967 | Nicholls et al. | 117—161 X |
| 2,335,944 | 12/1943 | Jung et al. | 96—87 |
| 3,549,375 | 12/1970 | Pechmann | 96—87 X |
| 3,551,152 | 12/1970 | Mackey et al. | 96—114.2 |

FOREIGN PATENTS

| | | | |
|---|---|---|---|
| 784,001 | 10/1957 | Great Britain | 117—161 X |
| 880,051 | 10/1961 | Great Britain | 117—161 X |

WILLIAM D. MARTIN, Primary Examiner

M. R. P. PERRONE Jr., Assistant Examiner

U.S. Cl. X.R.

96—114.2; 117—68, 161 UE; 260—78.5 R